Figure 6:
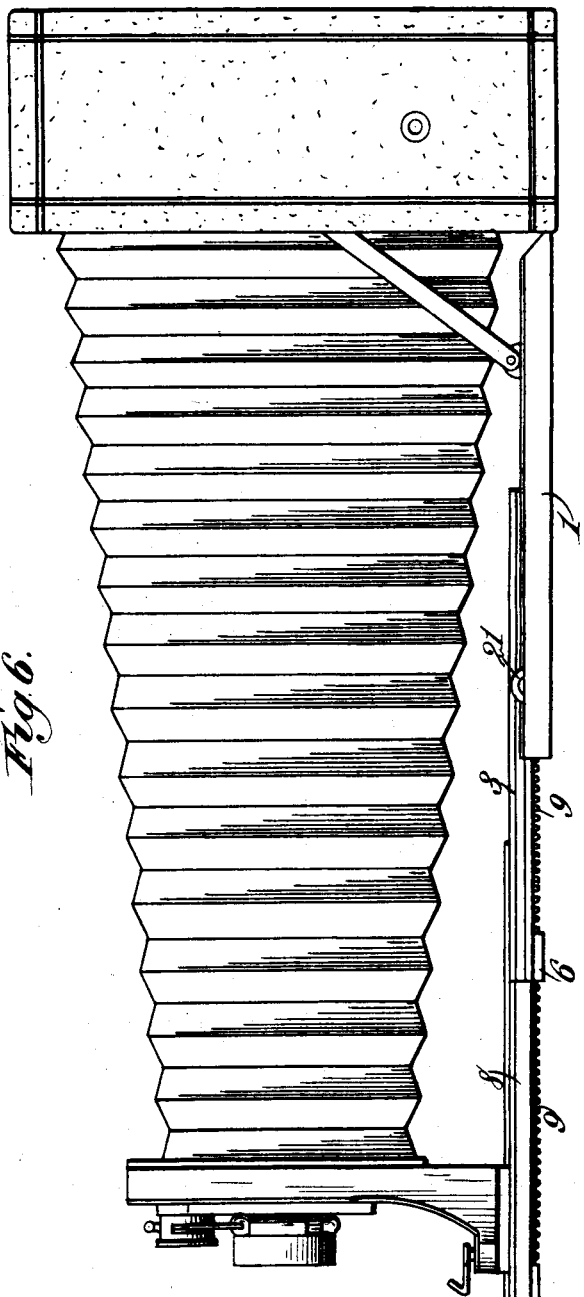

No. 682,081. Patented Sept. 3, 1901.
C. HUTCHINGS.
EXTENSION BED FOR PHOTOGRAPHIC CAMERAS.
(Application filed Jan. 17, 1901.)
(No Model.) 3 Sheets—Sheet 1.
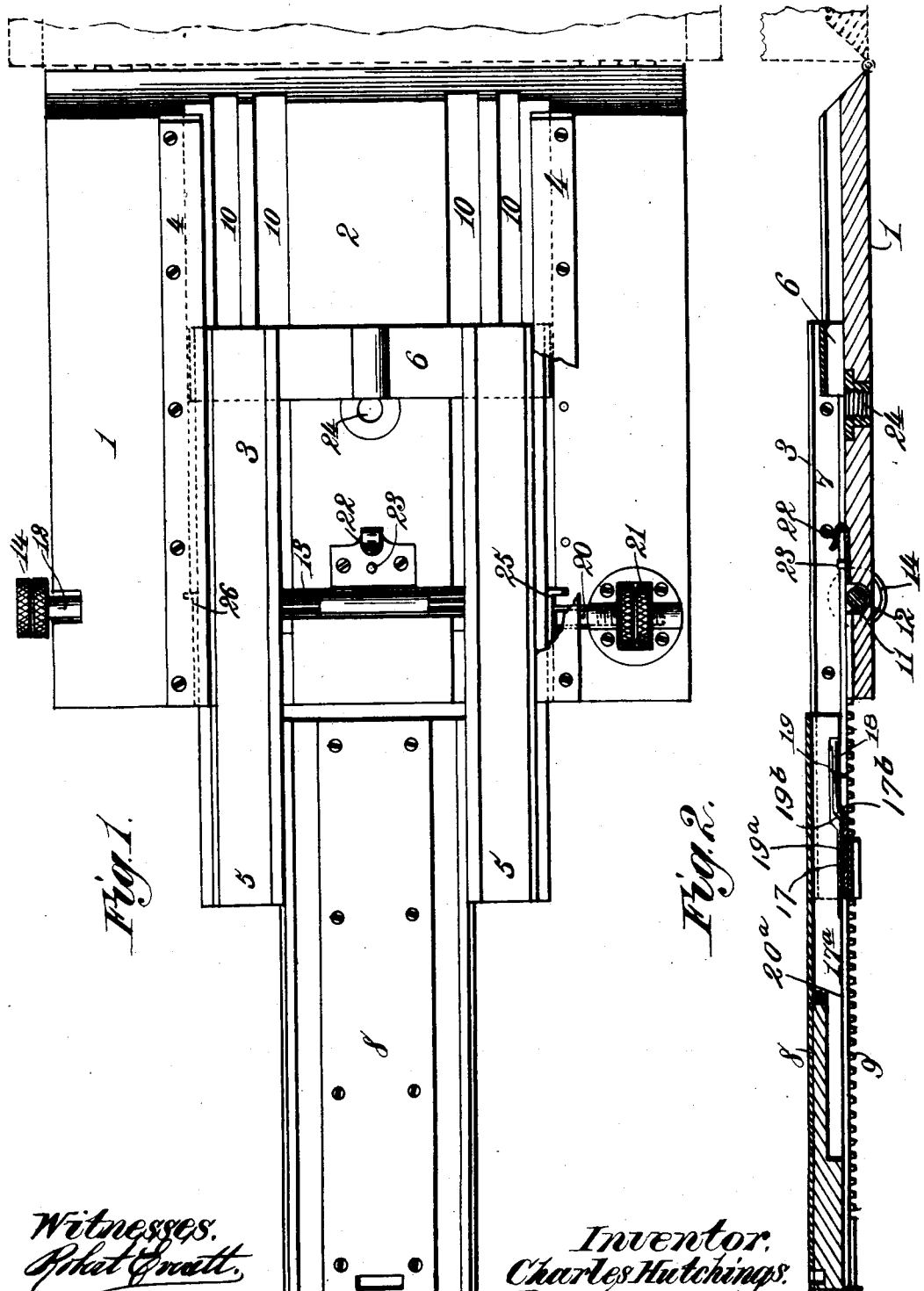

No. 682,081. Patented Sept. 3, 1901.
C. HUTCHINGS.
EXTENSION BED FOR PHOTOGRAPHIC CAMERAS.
(Application filed Jan. 17, 1901.)
(No Model.) 3 Sheets—Sheet 2.
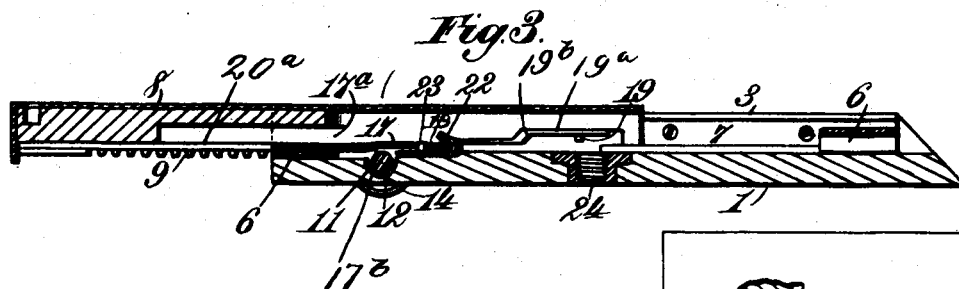
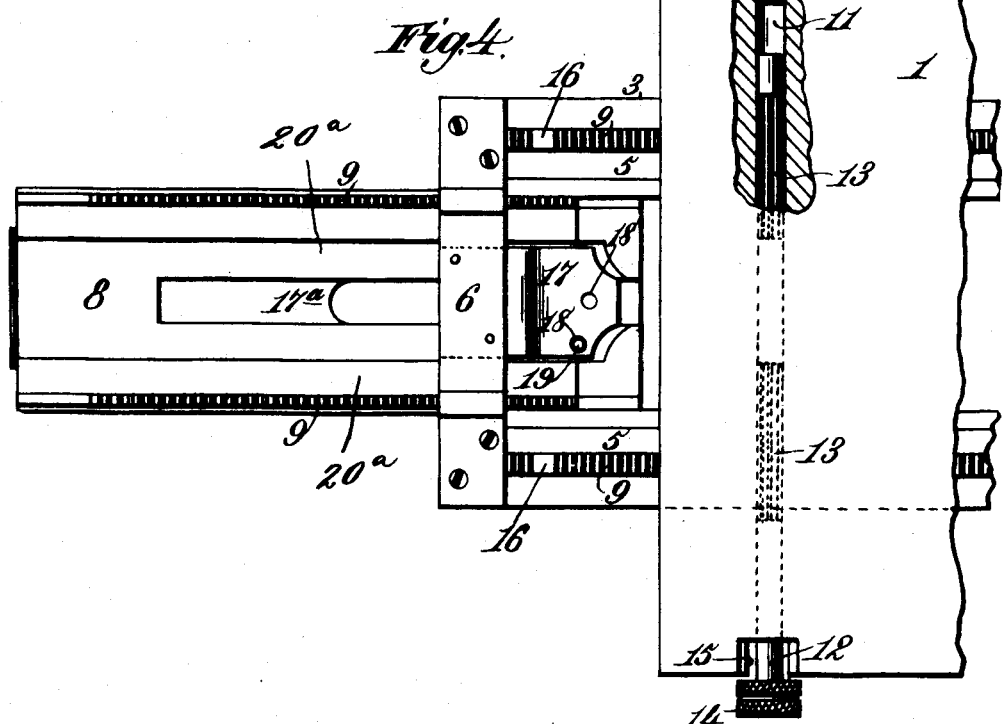
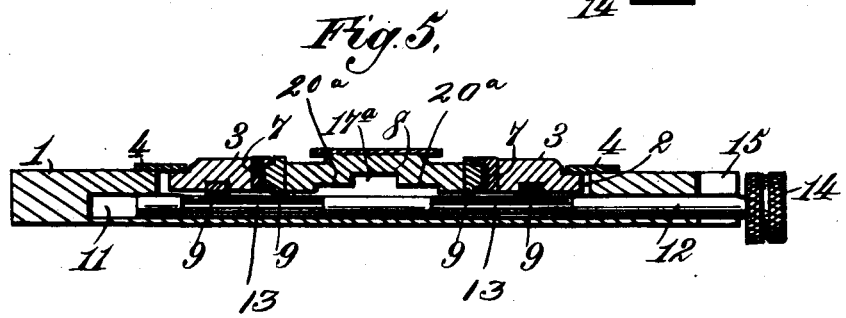
Witnesses. Inventor.
Charles Hutchings
By James L. Norris.
Atty.

No. 682,081. Patented Sept. 3, 1901.
C. HUTCHINGS.
EXTENSION BED FOR PHOTOGRAPHIC CAMERAS.
(Application filed Jan. 17, 1901.)
(No Model.) 3 Sheets—Sheet 3.

Witnesses.
Inventor.
Charles Hutchings.
By
Att'y.

UNITED STATES PATENT OFFICE.

CHARLES HUTCHINGS, OF ROCHESTER, NEW YORK, ASSIGNOR TO ROCHESTER OPTICAL AND CAMERA COMPANY, OF SAME PLACE.

EXTENSION-BED FOR PHOTOGRAPHIC CAMERAS.

SPECIFICATION forming part of Letters Patent No. 682,081, dated September 3, 1901.

Application filed January 17, 1901. Serial No. 43,633. (No model.)

*To all whom it may concern:*

Be it known that I, CHARLES HUTCHINGS, a citizen of the United States, residing at Rochester, in the county of Monroe and State of New York, have invented new and useful Improvements in Extension-Beds for Photographic Cameras, of which the following is a specification.

My invention relates to improvements in extension-beds for photographic cameras, and has for its object to provide such a bed composed of a plurality of extension-sections in gear with operating mechanism and provided with means whereby when one section is extended to its limit it is automatically locked to the other and held immovable or rigid to afford a firm support for the lens-carrier and its appurtenances, and whereby when said section is to be retracted it is automatically unlocked from the other section, which in turn is then automatically locked to the bed-plate, so as to be held immovable—in other words, to provide an extension-bed for photographic cameras composed of a plurality of extensible sections and means for automatically locking either of said sections immovable when the other is free to be adjusted.

To said end my invention consists in the novel construction, combination, arrangement, and operation of parts hereinafter described, and set forth in the following claims.

My invention is illustrated in the accompanying drawings, in which—

Figure 1 is a top plan view showing the sections extended and partly broken away to illustrate interior parts. Fig. 2 is a longitudinal sectional view showing the sections extended and locked together; Fig. 3, a similar view showing the same parts in different positions. Fig. 4 is a bottom plan view. Fig. 5 is a cross-sectional view, and Fig. 6 an elevation of the bed extended and supporting a camera lens-carrier.

In the said drawings the numeral 1 indicates the bed-plate, which in the preferred form of my invention consists of the hinged front of a photographic camera. It is provided with a channel 2, in which is arranged to move or slide an extension-section 3, held in the channel and guided therein by means of confining or guide strips 4. This section 3 is formed of parallel longitudinal bars 5, spaced apart by end pieces 6, the whole forming a skeleton rectangular frame. The inner faces of the longitudinal side members of the section are provided with guideways 7, in which a second extension-section 8 is arranged to move or slide. The extension-sections 3 and 8 are each provided on their under face with parallel racks 9, those of the section 3 being arranged outside the racks of the extension 8. The bed-plate is provided with a series of grooves 10 to accommodate the racks in the movement of the extension-sections. An open-shaft channel 11 leads in from the side of the bed-plate 1, and movably fitted therein is a pinion-shaft 12, provided with an extended pinion 13, the teeth of which are exposed in the open mouth of the channel for engagement with and operation of the racks 9 of the sections, whereby the latter are extended from or retracted into the bed-plate. The pinion-shaft is provided with a finger-piece 14 for facility of rotation and is shiftable in its channel, so that said finger-piece may be housed within a seat 15 in the bed-plate when the camera is closed and be withdrawn from said seat when the bed-plate is swung open and the extension-sections are to be manipulated. By arranging the parts as described it will be seen that the sections may be adjusted simply and with facility, as the racks of both are adapted to mesh with the pinion of the single shaft.

It is designed, in the operation of extending the bed of the camera to afford support for the lens-carrier and appurtenances, that the section 8 shall first be extended by rotation of the pinion-shaft, the pinion of which is in mesh with the racks of said section, and that in cases where the proper focus demands a more extended bed than that afforded by the capacity of extension of section 8 further extension shall be made by projecting the section 3. This sequence of operation is accomplished by interrupting the teeth of the racks of the section 3, as shown at 16, or, in other words, said racks are mutilated for this purpose and the tail ends of the racks of the section 8 intersect the line connecting the interruptions or mutilations. It will thus be seen that at all times until the section 8 has reached the limit of its extension and been locked, as hereinafter described, the pinion 13 lies in the mutilations or interruptions of the racks of section 3, so that the latter is not influenced by the rotation of said pinion.

When the section 8 is extended to its limit, it is essential for the proper firm support of the lens-carrier and its appurtenances that said section shall be held rigidly and immovable without liability or possibility of looseness or shifting, and this is secured automatically by a novel arrangement of locking means. A locking-plate 17, having an incline $17^b$ thereon, is secured to the outer end piece 6 of the section 3 and is composed of spring metal, its free end in advance of said incline lying within the plane of the under face of the section 8 and provided with a plurality of perforations 18. The locking-plate is normally and automatically in engagement with a stud or pin 19, carried by the section 8 when said section is extended, as clearly shown in the drawings, and thus the extension-section 8 is firmly locked to the section 3, so that it is immovable or fixed and affords a firm support for the lens-carrier. The stud or pin 19 is secured to a plate $19^a$, located in a recess in the section 8, which plate has an incline $19^b$ thereon, as clearly shown. When the proper focus requires that the lens-carrier and its appurtenances be supported beyond the limit or capacity of extension of the section 8, the section 3 is projected, its initial movement being accomplished by engagement of the tail ends of the racks of section 8 with the pinion, which intersect the line between the mutilations or interruptions 16 of the racks of the section 3. When the mutilated portions have passed, the pinion is in engagement with the teeth of the racks of section 3, and the latter, by rotation of said pinion, may be extended to its limit or to any intermediate point, as the occasion may require, and is held in such position of extension by means of a binding-pin 20, which is projected into effective engagement with the section 3 by rotation of a thumb-nut 21.

It is essential when the section 8 is extended to its limit and locked to the section 3 and it is desired to retract said section 8 that its locking engagement with the section 3 shall be released, and this is accomplished automatically by providing a lock-shifter 22, which is formed with or secured to the bed-plate 1 and arranged in the path of the locking-plate 17, a passage $17^a$ being provided therefor in the section 8, and the surface of the section 8 on each side of said passage lying in the same plane with the summit of the incline $19^b$, as shown at $20^a$. This lock-shifter exerts a cam action on the plate 17 when the pinion is rotated to retract the section 8 and pulls said plate from its engagement with the stud or pin 19 of the section 8, leaving the latter free to be retracted by the rotation of the pinion-shaft. When the lock or catch is released from its engagement with the stud or pin 19, carried by the section 8 in the manner just described, and the section 8 is slightly retracted independently of the section 3, the incline $19^b$ on the plate $19^a$ is brought into engagement with the incline $17^b$ on the locking-plate 17, and the free end of the latter is thereby forced downwardly, so as to bring one of its perforations 18 into engagement with a stud or pin 23, projecting from the bed-plate just in advance of the lock-release 22, whereby the section 3 is immovably locked to said bed-plate. This locking action between these two parts is maintained by the engagement of the surfaces $20^a$ of the section 8 with the incline $17^b$. The arrangement of locking mechanism and releasing mechanism thus serves to automatically hold the section 3 immovable at all times while the section 8 is being independently extended or retracted, and also automatically locks the section 8 firmly to the section 3 when the former is at its limit of extension and at all times during the extension or retraction of the section 3.

The numeral 24 indicates a perforation in the bed-plate for engaging means carried by the tripod to support the camera, and the numerals 25 and 26 designate stops at one end of the channel 2, in which the section 3 moves to prevent the entire withdrawal of said section. The stop 25 may be secured at one end only, the other end being free, in which case the binding-pin 20, when projected, forces said stop into engagement with the section 3, providing an extended frictional contact for holding the section in any adjusted position.

My invention affords a novel, simple, and compact entension-bed for photographic cameras, which is provided with an efficient automatic sefeguard, whereby its sections are firmly locked together when extended to afford a firm support for the lens-carrier and appurtenances and wherein the locking means is automatically shifted to lock either of the sections immovably while the other is being adjusted.

Having thus described my invention, what I claim is—

1. In an extension-bed for cameras, the combination with a plurality of sections and means for extending the same, of a locking device for connecting said sections with each other, and means for releasing said locking device from its engagement with one of said sections and throwing it into locking engagement with the part on which said sections are supported, as and for the purpose set forth.

2. In an extension-bed for cameras, the combination with a plurality of sections and means for extending the same, of a locking device carried by one of said sections and adapted to coöperate with the other of said sections and with the part on which said sections are supported, and means for releasing said locking device from the part with which it is in engagement and for throwing it into locking engagement with the other, as and for the purpose set forth.

3. In an extension-bed for cameras, the combination with a plurality of sections and means for extending the same, of a locking device carried by one of said sections and adapted to coöperate with the other of said sections and with the support for said sections, means on said support for releasing said locking device from its engagement with one of said sections, and means on one of said sections for throwing the same into locking engagement with said support, as and for the purpose set forth.

4. In an extension-bed for cameras, the combination with a plurality of sections and means for extending the same, of a locking device carried by one of said sections, coöperating means therefor on the other of said sections and on the support for said sections, means for releasing said locking device from its engagement with the coöperating means on said section, and means on one of said sections for throwing the locking device into locking engagement with the coöperating means on said support, as and for the purpose set forth.

5. In an extension-bed for cameras, the combination with a plurality of sections, means for extending the same and a support on which said sections are mounted, of a locking device for locking one of said sections to said support, the said locking device being automatically disengaged from said support and thrown into locking engagement with both of said sections, when the other of said sections reaches the limit of its movement in one direction, as and for the purpose set forth.

6. In an extension-bed for cameras, the combination with a plurality of sections, means for extending the same and a support on which said sections are mounted, of a locking device for locking one of said sections to said support, the said device being normally maintained in such locking position by the other of said sections and automatically disengaged therefrom and thrown into locking engagement with both of said sections when said other section reaches the limit of its movement in one direction, as and for the purpose set forth.

7. In an extension-bed for cameras, the combination with a plurality of sections, means for extending the same and a support on which said sections are mounted, of a spring locking device for locking one of said sections to said support, and engaging means on the other of said sections for normally maintaining said device in such locking position, the said device automatically springing out of engagement with said support and into locking engagement with both of said sections when the engaging means on said other section passes out of contact with the same, as and for the purpose set forth.

8. In an extension-bed for cameras, the combination with a plurality of sections, means for extending the same and a support on which said sections are mounted, of a spring locking-plate secured to one of said sections and having an incline thereon, and coöperating locking means for said plate on said support, and on the other of said sections, the latter section having a recess therein for receiving said plate, and having an incline thereon adjacent to said recess, the said other section normally bearing against said plate and serving to maintain the same in locking engagement with the coöperating means on said support, and said recess permitting said plate to spring out of engagement with said support and into locking engagement with the coöperating means on said other section, when the latter is moved so as to bring the incline thereon opposite the incline on said plate, as and for the purpose set forth.

9. In an extension-bed for cameras, the combination with a plurality of sections, means for extending the same and a support on which said sections are mounted, of a spring locking-plate secured to one of said sections and having an incline thereon, coöperating locking means for said plate on said support and on the other of said sections, the latter section having a recess therein for receiving said plate and having an incline thereon adjacent to said recess, and means on said support for releasing said plate from its locking engagement with the coöperating means on said other section, the incline on said section adapted to engage the incline on said plate for forcing the same into locking engagement with the coöperating means on said support, as and for the purpose set forth.

10. In an extension-bed for cameras, the combination with a plurality of sections, means for extending the same and a support on which said sections are mounted, of a spring locking-plate secured to one of said sections having an incline thereon and provided with perforations, a pin or projection on said support adapted to enter one of said perforations, a pin or projection on the other of said sections adapted to enter another of said perforations, the said other section having a recess therein for receiving said plate and having an incline thereon adjacent to said recess, and means on said support for moving said plate away from said other section so as to disengage the perforation therein from the pin on said section, the incline on said section adapted to engage the incline on said plate for moving the latter so as to cause the engagement of one of the perforations therein with the pin on said support, as and for the purpose set forth.

11. In an extension-bed for cameras, the combination with a bed-plate, a plurality of extension-sections carried thereby and means for adjusting said sections, of a locking device operatively connected with one of said sections, engaging means for said locking device carried by the other of said sections, engaging means for said locking device carried by the bed-plate, and means for shifting the locking device into operative relation to one or the other of said engaging means, as and for the purpose set forth.

12. In an extension-bed for cameras, the combination with a bed-plate, a plurality of extension-sections carried thereby, and means for adjusting said sections, of a locking device carried by one of said sections which automatically engages another of said sections when the latter is extended, to firmly lock the sections together, and means on the bed-plate in the path of said locking device for releasing the locking engagement of the sections when the extended section is being retracted, and means for throwing said locking device into locking engagement with said bed-plate, as and for the purpose set forth.

13. In an extension-bed for cameras, the combination with a bed-plate, a plurality of extension-sections carried thereby, and means for adjusting said sections, of a locking-plate carrried by one of said sections, means carried by the other of said sections with which the locking-plate engages automatically when the latter is extended, means carried by the bed-plate for engaging said locking-plate, a shifter arranged in the path of said plate which operates to release the engagement of the locking-plate with the extended section, and means for moving said locking-plate into engagement with the bed-plate during the retraction of said extended plate, substantially as described.

14. In an extension-bed for cameras, the combination with a bed-plate, a plurality of extension-sections carried thereby, and means for adjusting said sections, of a locking-plate carried by one of said sections, means for engaging the locking-plate carried by the other of said sections and other means for engaging said locking-plate carried by the bed-plate, a lock-shifter carried by the bed-plate and arranged in the path of the locking-plate for disengaging the locking-plate from the extended section when the extended section is retracted, means for moving said locking-plate into engagement with the bed-plate during the retraction of the extended section, and means for disengaging the locking-plate from said bed-plate and moving it into engagement with said other section when the latter has reached the limit of its extension, as and for the purpose set forth.

15. In an extension-bed for cameras, the combination with a bed-plate, of a plurality of extension-sections carried thereby and provided with racks, a single pinion engaging said racks for adjustment of both of said sections, a locking-plate carried by one of said sections and adapted to automatically engage the other thereof when extended, a lock-shifter adapted to release the engagement of said plate from the extended section, and means for forcing said locking-plate into engagement with the bed-plate when said extended section is being retracted, substantially as described.

In testimony whereof I have hereunto set my hand in presence of two subscribing witnesses.

CHARLES HUTCHINGS.

Witnesses:
H. B. CARLTON,
J. A. ROBERTSON.